United States

Goldman

[11] 3,982,103
[51] Sept. 21, 1976

[54] CREDIT VERIFICATION SYSTEM
[75] Inventor: Robert N. Goldman, Kailua, Hawaii
[73] Assignee: Telecredit, Inc., Los Angeles, Calif.
[22] Filed: June 23, 1975
[21] Appl. No.: 589,649

Related U.S. Application Data

[63] Continuation-in-part of Ser. No. 406,063, Oct. 12, 1973, Pat. No. 3,891,830, which is a continuation of Ser. No. 150,601, June 7, 1971, abandoned, which is a continuation-in-part of Ser. No. 558,127, June 16, 1966, Pat. No. 3,610,889.

[52] U.S. Cl. ................. 235/61.7 B; 235/61.11 D; 340/149 A
[51] Int. Cl.² ................... G06K 7/08; G06K 19/08; H04Q 11/04
[58] Field of Search ........... 235/61.7 B, 61.11 R, 235/61.11 A, 61.11 B, 61.11 D, 61.11 E, 61.12 M; 250/569; 340/149 R, 149 A; 200/46; 360/2; 194/4

[56] References Cited
UNITED STATES PATENTS

| | | | |
|---|---|---|---|
| 3,394,246 | 7/1968 | Goldman | 235/61.7 B |
| 3,564,210 | 2/1971 | Presti | 235/61.7 B |
| 3,610,889 | 10/1971 | Goldman | 235/61.7 B |
| 3,662,343 | 5/1972 | Goldstein | 340/149 A |
| 3,845,277 | 10/1974 | Voss | 235/61.7 B |
| 3,891,830 | 6/1975 | Goldman | 235/61.7 B |

*Primary Examiner*—Daryl W. Cook
*Assistant Examiner*—Robert M. Kilgore
*Attorney, Agent, or Firm*—Nilsson, Robbins, Dalgarn & Berliner

[57] ABSTRACT

A credit verification system is disclosed including remote terminals and a central unit, for use with identification cards carrying a changeable recording medium. On presentation, cards are sensed to provide signals indicative of identification with (1) an aggregate amount of all value transactions supported by the card during a period (month) and (2) an aggregate amount of all those value transactions occurring at "off-line" stations or terminals during the period. Each terminal senses signals indicative of amounts of values as a control, depending upon the current mode of operation for the terminal involved, e.g. "off-line" or "on-line." Approval is indicated in either state, providing the card is acceptable under established criteria for each state, e.g. that the imposed limits are not exceeded.

12 Claims, 9 Drawing Figures

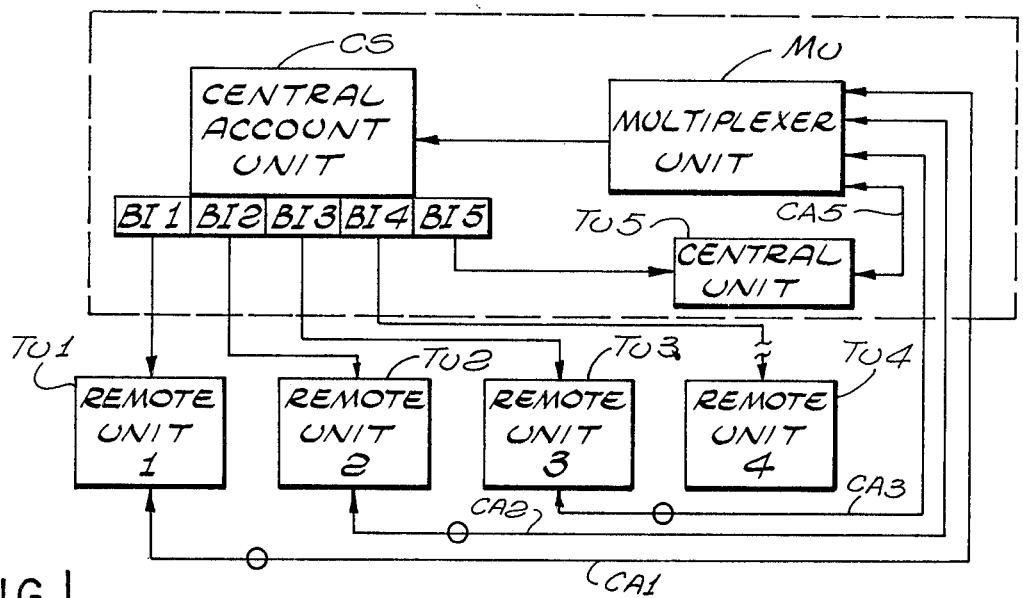
FIG.1.
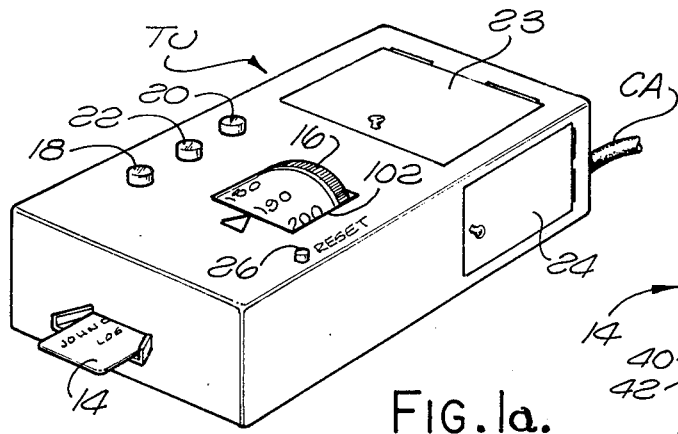
FIG.1a.
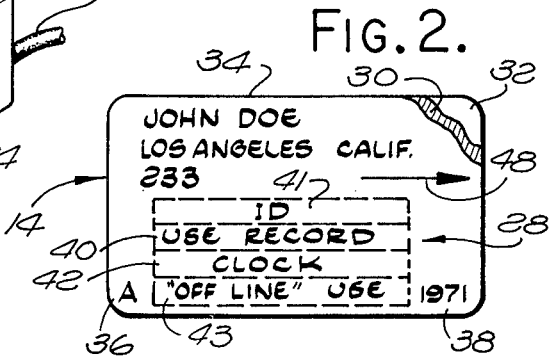
FIG.2.
| 41 | CARD HOLDERS IDENTIFICATION | ~RN1 - RN9~ |
|---|---|---|
| 40 | AGGREGATE VALUE OF TRANSACTIONS | —PERIOD ~ R1 - R9~ |
| 42 | CLOCK CHANNEL | ~ C ~ |
| 43 | AGGREGATE VALUE OF "OFF LINE" TRANSACTIONS | —PERIOD ~ RO1 - RO9~ |
FIG.2a.

CREDIT VERIFICATION SYSTEM

RELATED SUBJECT MATTER

This is a continuation-in-part of Ser. No. 406,063, filed Oct. 12, 1973 (now U.S. Pat. No. 3,891,830) which was a continuation of Ser. No. 150,601, filed June 7, 1971, abandoned, which was a continuation-in-part of Ser. No. 558,127, filed June 16, 1966 (now U.S. Pat. No. 3,610,889).

BACKGROUND AND SUMMARY OF THE INVENTION

Various forms of identification cards or credit cards have come into exceedingly widespread use to designate the owner as a person to whom credit may be extended. These cards have been successful largely because they enable the owner to avoid carrying significant amounts of cash. However, the use of the cards and similar devices has not been without certain attendant difficulties. For example, the owner of a credit card may become irresponsible due to financial reverses, whereupon he may incur a large indebtedness based on his credit card, which indebtedness may not be recoverable.

Another problem in the use of cards, plates, and other devices employed to identify a person for credit, stems from the loss of such devices. That is, the owner of a credit card may lose his card or it may be stolen, whereupon an unauthorized bearer may make large purchases supported by the credit card. Generally, in such a situation, either the owner of the credit card or the issuing organization incurs a substantial loss.

In view of these difficulties, some attempts have been made to control the use of credit cards. For example, it has been proposed to utilize a central computer which maintains a current balance for each issued credit card. A warning is then provided in the event a credit card is used to excess. However, in general, systems of this type have been limited for two reasons. First, the requisite computer is inherently expensive, both in acquisition and in maintenance. However, systems implementing automatic funds transfer may justify the cost. Second, it is a requirement of the system that upon each presentation of the credit card, communication must be established with the computer, e.g. terminals must be "on-line". As a result, the usability of the card may be quite restricted or the necessary communication system reaches vast proportions.

Therefore, considerable need exists for a practical system, for use in cooperation with credit cards and related devices, which system may be effectively operated with terminals either "on-line" or "off-line" to control the use of these devices and thereby minimize financial loss, both to the persons to whom the cards are assigned (owners) and to the issuing organization. In this regard, the present invention is based upon the recognition of the expense and difficulty of perpetually operating a remote terminal system in an "on-line" configuration. Specifically, the present invention accommodates "off-line" operation of remote terminals, for example, in the event of a communication line failure, a central equipment failure or shut down, or by design.

As disclosed in U.S. Pat. No. 3,891,830, the significance of time or discrete time intervals as a factor in controlling the use of a credit card has been recognized. The present invention contemplates control of identification devices based on use of such devices as related to a particular interval of time as in an integral component of a system which includes a plurality of terminals, at least part of which are coupled for communication with a central unit.

In a system utilizing a central computer to maintain a current balance (or related data) for each credit card in use, communication between a remote station and the central unit is a requisite to each operation of any remote station. Otherwise, the current-balance data could not be consulted prior to consummating a proposed transaction. Of course, the system might employ alternative control criteria during limited lapses of communication; however, as a consequence, the current-balance data in the central unit may become incorrect, which would bear heavily on subsequent control as well as funds-transfer considerations. Also, the alternative control criteria may be difficult to preserve in alternate "off-line" and "on-line" uses of the card.

The system of the present invention may be embodied as a central unit and a plurality of remote stations that are operated in either an "off-line" or an "on-line" configuration in cooperation with an identification card or the like, which bears a recording medium thereon. The system incorporates means to indicate a predetermined interval of time, and further includes means for sensing the recording medium on the card to provide an indication of the last time when the card was used. Furthermore, the system as disclosed records data on the extent of use of the card during the interval of last use and the extent of such use at terminals in an "off-line" configuration.

BRIEF DESCRIPTION OF THE DRAWINGS

FIG. 1 is a block diagram of a system in accordance herewith;

FIG. 1a is a perspective view of a terminal unit of the system of FIG. 1;

FIG. 2 is a plan view of an identification card suitable for use in cooperation with the unit of FIG. 1;

FIG. 2a is a diagrammatic representation of the recording format on the card of FIG. 2;

DETAILED DESCRIPTION OF THE ILLUSTRATIVE EMBODIMENT

Figure 3:
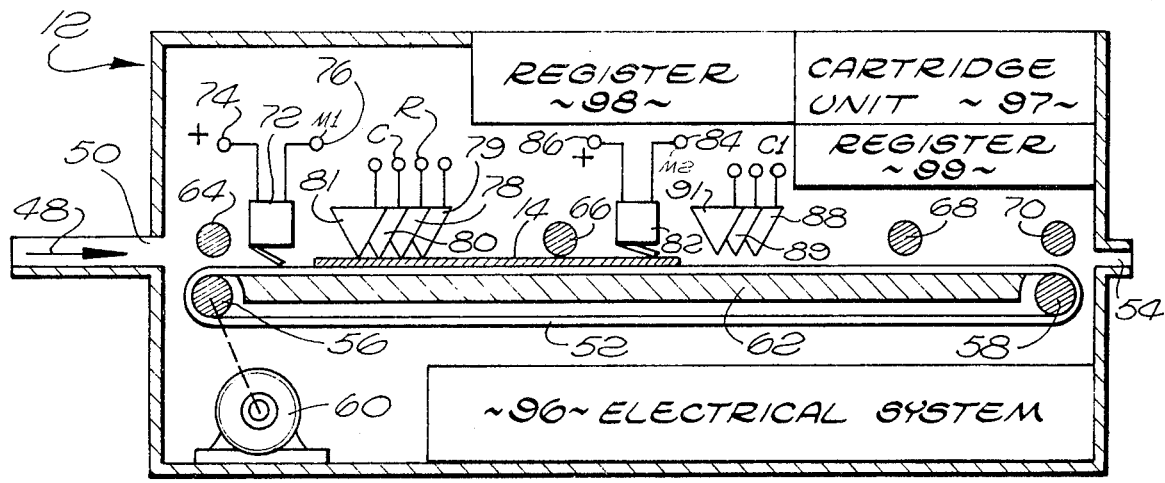
FIG. 3 is a diagrammatic and vertical sectional view taken through the structure of FIG. 1.

Referring initially to FIG. 1 a central account unit CS is indicated in association with a plurality of terminal units TU1, TU2, TU3, TU4, and TU5. The central account unit CS includes an accounting computer as well known in the art and functions to record balance data on accounts for which credit cards have been issued. The central account unit CS may take various forms, and in that regard a variety of accounting machines are well known in the prior art, e.g. see U.S. Pat. Nos. 2,018,420; 2,357,455; 2,535,218; 2,947,475; and 3,146,342.

The central account unit CS also includes a series of binary devices BI1, BI2, BI3, BI4, and BI5 for providing signals to indicate whether specific terminal units T4 are in an "off-line" or an "on-line" configuration with respect to the central unit CS. Additionally, the terminal units TU are coupled to the central unit CS through a multiplexer unit MU and cables CA, for detailed data exchange. Of course, the structural details of such communication systems are well known in the prior art.

Physically, the central account unit CS would perhaps be located at the facility of a bank thrift or other organization, along with the multiplexer unit MU and the central terminal unit TU5. The remote terminals TU1, TU2, TU3 and TU4 would be situated at locations remote from the facility at which remote credit approvals or transactions will be consummated, on the basis of a credit card. As indicated above, such transactions are consummated during intervals when the remote units TU are "off-line" (not in communication with the central unit CS) as well as during "on-line" operation. The confines of card use to support transactions involve value limits in relation to time and/or account status data carried in the central account unit CS.

Considering the terminal units TU and the operation of such units in greater detail, the unit TU5 is generally "on-line" if available for use. Specifically, for example, if the facility housing the unit TU5, as well as the central account unit CS, is open both are generally operative or if not operative are not available for use. This exemplary consideration is relative merely to illustrate a terminal unit TU which, within the confines of practicality, is perpetually "on-line". Conversely, the remote terminal unit TU4, for the periods of operation considered, is perpetually "off-line". The remaining terminal units TU1, TU2 and TU3 may be operative and either "on-line" or "off-line" depending upon the state of the central unit CS and communications lines thereto. That is, the units TU1, TU2 and TU3 can function in either the "off-line" or the "on-line" state. It is emphasized that some units may be perpetually "off-line" or "on-line" and operate effectively in relation to the total system.

FIG. 1a shows a unit TU, exemplary of each such unit, receiving a cooperating identification card 14 for evaluation. The unit TU indicates a value, e.g. dollar amount, through a window 16, indicating a contemplated purchase. In general, a customer (card bearer) may be authorized to purchase a predetermined dollar value of goods and services over a specified period. For example, during any given month, a consumer may have credit to a predetermined amount, e.g. $100.00, usable at any of a number of establishments individually or collectively. As considered above, various previously proposed systems of the prior art utilizing a central computer could possible accomplish such an arrangement; however, the cost and difficulty of operating such a system with perpetual "on-line" communication for all remote terminal units TU are very great. Consequently, a system wherein terminals units may function effectively in either an "on-line" or an "off-line" mode affords considerable advantage.

If in the "off-line" mode, the system hereof determines whether the customer has exceeded his limit with the inclusion of the amount shown in the window 16. If "on-line", approval is based on the subject's account data and the transaction is authorized providing the card is not carried on a list of invalidated cards contained in the unit. Approval is indicated by illumination of a green lamp 18. A red lamp 20 indicates rejection, and a yellow lamp 22 indicates caution or standby.

The unit 12 houses a magnetic-tape cartridge receptacle as disclosed in detail below. Access to that receptacle is provided through a door 23. Another door 24 provides access for setting an interval register to indicate the instant month, as disclosed in detail below. Finally, a reset button 26 on the unit is used to clear the unit after a card has been tested and provide a residual "yellow" display by lamp 22.

The identification device or card may take a wide variety of different forms and the card 14 (FIG. 2) is merely illustrative. The card 14 comprises laminated embossed plastic material having a strip 28 of magnetic recording medium, e.g. fine iron oxide particles, sandwiched between plastic laminations. Specifically, as shown in FIG. 2, an upper lamination 30 is bonded to a lower lamination 32 with the strip 28 therebetween. The upper section 34 of the card receives embossed letters identifying the owner by name, address, and account number.

The information recorded in the strip 28 normally is not humanly perceivable and if desired the strip can be concealed by making the laminations 30 and 32 opaque. However, the strip 28 is shown in phantom in FIG. 2, to include four serial channels 40, 41, 42, and 43 for recording binary digits. The channel 42 (see FIG. 2a) may be termed a clock channel and has regularly-spaced, permanently-recorded magnetic variations for timing and identifying the designations recorded in the channels 40, 41, and 43. The designations recorded in the channel 42 may be sensed by a magnetic transducer to provide impulses, spaced apart to establish time bit positions.

The actual code information signals are provided by sequential sensing of the channels 40, 41, and 43. Essentially, the channels 40 and 43 record binary digits (card use information) while the channel 41 records decimal digits (card number). It is noteworthy, however, that the art of data recording is quite advanced with the result that many techniques have been developed. The use of a clock channel and data channels is one technique; however, several alternative arrangements are widely known and used, including techniques employing a single channel as with phase-significant signals.

More specifically, the track or channel 40 records binary signals representative of: (1) the interval (month) when the card was last used to support a transaction, and (2) the aggregate amount of transactions supported by the card during the interval. The channel 43 records similar binary signals; however, with the aggregate amount of transactions being limited solely to transactions that occur while the unit involved is in an "off-line" mode. The track or channel 41 records binary signals representative of decimal digits comprising the card number, which may also be embossed on the card.

The operation and structure for sensing the data and clock channels 40, 41, 42, and 43 and utilizing such information will be considered in detail below. However, preliminarily it is to be noted that the card 14 is to be inserted in the unit TU (FIG. 3) as indicated by an arrow 48 so that the channels will be sensed from right to left in accordance with the convention adopted herein. As a result, the areas in the channels indicate binary digits from right to left, of increasing significance. The discrete areas of the channel 42 identify the discrete areas indicative of binary digits. In this regard, an initial "zero" or "ready" clock pulse is also carried in the channel 42 for timing purposes.

As indicated above, channel 41 indicates the card number, and the channels 40 and 43 each indicate a month and a value (dollar amount) as set forth in the following chart:

CHART NO. 1

| Month | Time Signal Code | | | |
|---|---|---|---|---|
| | R4 | R3 | R2 | R1 |
| January | 0 | 0 | 0 | 1 |
| February | 0 | 0 | 1 | 0 |
| March | 0 | 0 | 1 | 1 |
| April | 0 | 1 | 0 | 0 |
| May | 0 | 1 | 0 | 1 |
| June | 0 | 1 | 1 | 0 |
| July | 0 | 1 | 1 | 1 |
| August | 1 | 0 | 0 | 0 |
| September | 1 | 0 | 0 | 1 |
| October | 1 | 0 | 1 | 0 |
| November | 1 | 0 | 1 | 1 |
| December | 1 | 1 | 0 | 0 |

| Cumulative Purchase Value | Code | | | | |
|---|---|---|---|---|---|
| | R9 | R8 | R7 | R6 | R5 |
| $10.00 | 0 | 0 | 0 | 0 | 1 |
| 20.00 | 0 | 0 | 0 | 1 | 0 |
| 30.00 | 0 | 0 | 0 | 1 | 1 |
| 40.00 | 0 | 0 | 1 | 0 | 0 |
| 50.00 | 0 | 0 | 1 | 0 | 1 |
| 60.00 | 0 | 0 | 1 | 1 | 0 |
| 70.00 | 0 | 0 | 1 | 1 | 1 |
| 80.00 | 0 | 1 | 0 | 0 | 0 |
| 90.00 | 0 | 1 | 0 | 0 | 1 |
| 100.00 | 0 | 1 | 0 | 1 | 0 |
| 110.00 | 0 | 1 | 0 | 1 | 1 |
| 120.00 | 0 | 1 | 1 | 0 | 0 |
| 130.00 | 0 | 1 | 1 | 0 | 1 |
| 140.00 | 0 | 1 | 1 | 1 | 0 |
| 150.00 | 0 | 1 | 1 | 1 | 1 |
| 160.00 | 1 | 0 | 0 | 0 | 0 |
| 170.00 | 1 | 0 | 0 | 0 | 1 |
| 180.00 | 1 | 0 | 0 | 1 | 0 |
| 190.00 | 1 | 0 | 0 | 1 | 1 |
| 200.00 | 1 | 0 | 1 | 0 | 0 |
| 210.00 | 1 | 0 | 1 | 0 | 1 |
| 220.00 | 1 | 0 | 1 | 1 | 0 |
| 230.00 | 1 | 0 | 1 | 1 | 1 |
| 240.00 | 1 | 1 | 0 | 0 | 0 |
| 250.00 | 1 | 1 | 0 | 0 | 1 |
| 260.00 | 1 | 1 | 0 | 1 | 0 |
| 270.00 | 1 | 1 | 0 | 1 | 1 |
| 280.00 | 1 | 1 | 1 | 0 | 0 |
| 290.00 | 1 | 1 | 1 | 0 | 1 |
| 300.00 | 1 | 1 | 1 | 1 | 0 |
| 310.00 | 1 | 1 | 1 | 1 | 1 |

The above code signals bear a designation R, indicating signals sensed from the card. However, similar code signals are designated D and are provided from elements of the unit TU as described below.

The structure for sensing code signals from the magnetic strip 28 is shown in FIG. 3, indicating a partly diagrammatic sectional view through the unit 12. The card 14 is placed into the unit TU through an entry port 50 to be received on a rotary belt 52 for movement through the unit to an exit port 54. The belt 52 may comprise any of a variety of endless flexible forms and is held extended between a drive roller 56 and an idler roller 58 fixed at opposite ends of the unit. The drive roller 56 is mechanically coupled to be revolved by a motor 60 which moves the belt 52 at a substantially constant speed, e.g. five inches per second across a support table 62.

As a card is carried across the table 62 it is held down by a series of rollers. Specifically, a first roller 64 is rotably mounted above the roller 56 to engage the card 14 upon entry and hold the card in firm engagement with the belt 52. Spaced apart along the belt 52, rollers 66, 68, and 70 perform a function similar to that of the roller 64.

Upon passing between the rollers 56 and 64, the card 14 engages a microswitch 72 which is connected between a source of potential (applied to a terminal 74) and an output terminal 76. The signal appearing at the terminal 76 is termed M1 herein and is used as a timing signal. In this regard, a number of timing and operation signals are developed and utilized in the exemplary structure which will be introduced and explained below; however, for convenience these signals are set forth here as:

SIGNAL IDENTIFICATION

Time Code Signals
BR    A generic designation for signals from the central unit CS to modify card data when "on-line"
D1    First bit, month
D2    Second bit, month
D3    Third bit, month
D4    Fourth bit, month
D5    First bit, value
D6    Second bit, value
D7    Third bit, value
D8    Fourth bit, value
D9    Fifth bit, value
D    Generic designation for signals D1–D9 - unit -registered
R1–R9    Card-registered total transactions signals (Code - see above chart)
RO1–RO9    Card-registered "off-line" transactions signals (Code-see above chart)
R    Generic designation for card-registered signals R1–R9
RO    Generic designation for card-registered signals RO1–RO9
RN1–RN9    Card number binary digital signals. (From card)
DN1–DN9    Card number binary digital signals. (From revoked card list)

Binary Operation Signals
M1    Microswitch signal (first card position)
M2    Microswitch signal (second card position)
M3    Operation complete signal
C    Clock signal (read section - phase 1)
C1    Clock signal (record section - phase 2)
S0–S9    Card position signals (clocked binary and decimal digits)
P1    Phase one-operation signal
P2    Phase two-operation signal
P3    Phase three-operation signal
GR    Green light signal - approval - off line
RD    Red light signal - disapproval - off line
Y    Yellow light signal - improper code, or the like
'    Indicates binary negation of a signal
RS    Reset signal (manual)
BI1–BI5    On or off-line signals
BI    Generic to BI1–BI5
AP    Central unit approval
DA    Central unit disapproval
L    Preliminary disapproval signal - off line
NG    "no go" signal indicates unauthorized situation
V    Valid timing for card use
I    Difference exists between time on card and in register
RL    Regular limits (per card number coding)
RL'    Double regular limits Returning to a consideration of the motion of the card 14 through the unit TU (FIG. 3) after the leading edge of the card activates the microswitch 72, the card moves under side-by-side magnetic reading heads 78, 79, 80, and 81, which sense the channels 40, 41, 42, and 43, respectively, of the card. The heads 78, 79, 80, and 81 are shown diagrammatically and are understood to be aligned in spaced-apart relationship. The read head 80, sensing the clock channel 42 provides a uniform series of pulses which are termed clock pulses C. The heads 78 and 81 sense the channels 40 and 43 providing binary code pulses R and RO, representative of binary digits (from least-significant to most-significant) as characterized by the code set forth in the chart above and identified as digits R1 through R9 and RO1 through RO9, respectively. Similarly, the head 79 senses the card-number signals RN1 through RN9 from the channel 41.

Continued movement of the card 14 through the unit TU brings the leading edge of the card into contact with a microswitch 82 to actuate the microswitch forming a signal M2 high at a terminal 84 by closing the switch to a source of potential indicated to be applied at the terminal 86. Next, the card 14 moves under magnetic recording heads 88 and 91 along with reading head 89 which cooperate with the electrical system 96 to update the signals recorded in channels 40 and 43 if the unit TU is "off-line".

The unit TU also houses the electrical system 96, a magnetic cartridge or cassette tape unit 97 and electro-mechanical registers 98 and 99. The contemplated amount of purchase or transaction value to be supported by the credit card is set on the electromechanical register 98 manually, to be indicated in the window 16 (FIG. 1a). The current month, or other period is set on the register 99. The details of these units are set forth below.

Figure 4:
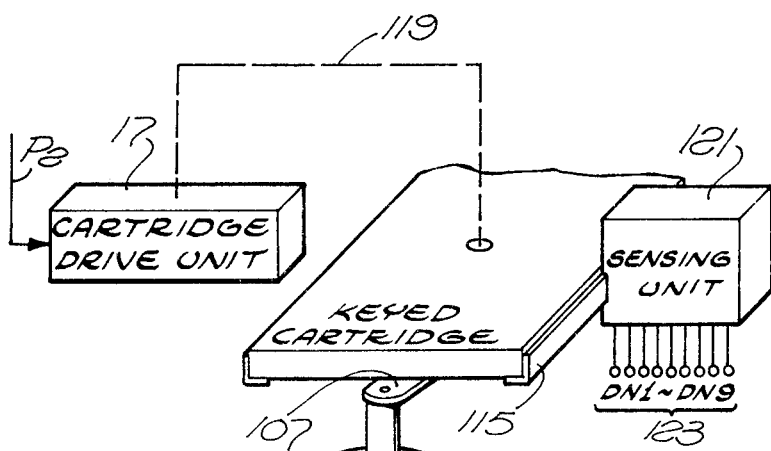
FIG. 4 is a schematic and perspective view of a component part of the system of FIG. 1.

The register 98 as depicted in FIG. 4 may be manually set to display an amount and also control switches to provide electrical binary signals D5–D9 indicative of that amount. Considering the structure, values as indicated in the above chart are visually displayed about the periphery of a drum 102. The drum 102 is mounted for independent rotation and incorporates an indexing ratchet 105 so as to be settable to indicate various values.

The drum 102 is carried on a shaft 112 which rotably supports a signal drum 114 having switch-closing radially-extending pins 116. The pins 116 variously engage the switches 118, depending on the angular offset of the drum 114, to provide binary signals D5–D9 at terminals 120 which manifest the indicated amounts in accordance with the code set forth above. Specifically, for example, when the drum 102 is set to indicate "$70.00", the terminals 120 provide a binary code 00111. Thus, the terminals 120 provide binary parallel signals D5–D9, indicative of the amount registered.

Figure 5:
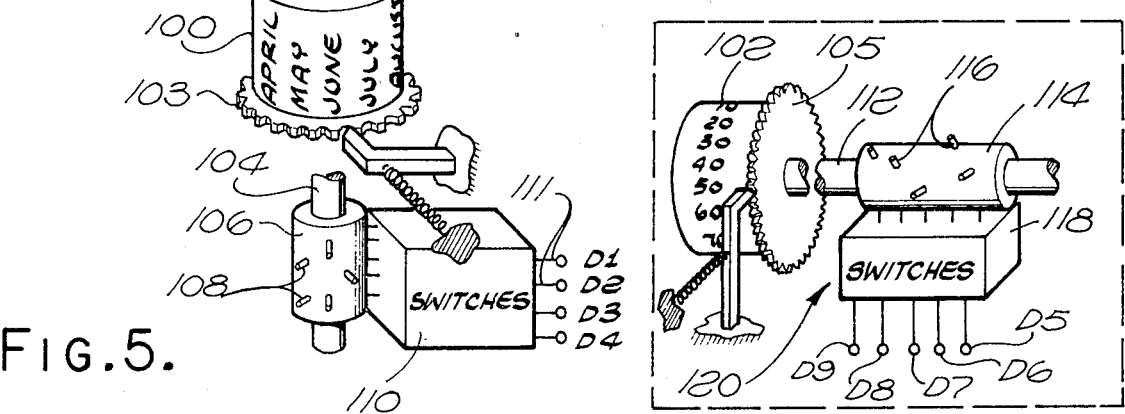
FIG. 5 is a schematic and perspective view of another component part of the system of FIG. 1.

Considering the details of the month register 99 (FIG. 3) reference will now be made to FIG. 5, showing that structure along with the magnetic-tape structure. The register includes a drum 100 that may be manually set to a particular month whereby a proper month cartridge 113 will be accepted and appropriate month-indicating signals will be provided as set out in the above chart. Specifically, the drum 100 is vertically supported on a rotary shaft 104 which terminates in a rotary index key 107, and which also carries a signal drum 106 from which actuating pins 108 extend radially to control switches 110 in accordance with the angular position of the drum 106. When the drum 100 is positioned to indicate a particular month, the attached drum 106 is positioned to close certain of the switches 110 and provide binary digits D1–D4 at terminals 11 which are indicative of the selected month. For example, when the unit is set at "May" the code signals 0101 are provided at the terminals 111.

The setting of the drum 100 to indicate a particular month also sets the index key 107 in one of twelve positions in a circular pattern to be matingly received in an indentation (not shown) in a proper-month cartridge 113. Accordingly, the cartridge 113 is recorded for a specific month and similarly indexed by a small indentation on the underside thereof to receive the key 107. Consequently, coincidence of the desired month for operation and the month to which the cartridge 113 relates is controlled by the keyed relationship which limits the entry of cartridges in the holder 115.

The cartridge 113 may take a variety of forms of devices for storing signal-represented data or information. In the embodiment as described, a magnetic tape structure is disclosed carrying a closed loop of tape as well known in the prior art and as disclosed in U.S. Pat. Nos. 2,876,005 and 2,658,955. The tape is moved by a drive unit 117 which is mechanically coupled, as well known in the art, to the cartridge 113, as indicated by a dashed line 119. The tape cartridge 113 is sensed by a sensing unit 121 to provide recurring sets of nine decimal digit code words at terminals 123. In general, and as described in detail below, these signal-represented code words represent the card numbers (DN1–DN9) which have become unacceptable. Additionally, specific digits may designate the credit control limits to be imposed at the location of the system, which may be varied from month to month.

For example, the first digit of a card number (DN1 and DN2) may be coded to indicate the card holder's credit limits, which in turn may be varied by data carried on the cartridge 113 in the same digit location. For example, the least significant digits of the card number may have the following significance.

| N1, N2 | Regular Limits |
|---|---|
| 0 | Card owner entitled to $20.00 credit per month |
| 1 | Card owner entitled to $40.00 credit per month |
| 2 | Card owner entitled to $80.00 credit per month |
| 3 | Card owner entitled to $160.00 credit per month |

If the limits are to be liberalized, at a specific location, then the cartridge 113 may be coded, for example, to double the regular limits after an initial test cycle. It is noteworthy that in an actual system this flexibility may be expanded. For example, the time consideration may be altered. Also, it is to be recognized that as disclosed herein, the total number of cards accommodated is merely exemplary. Recognizing this consideration, the format for the binary-decimal signals carried in the cartridge 113 may be as follows.

| Decimal Code | | | | | | | | | Indication |
|---|---|---|---|---|---|---|---|---|---|
| (Prefix "D" indicates from cartridge 113, and prefix "R" indicates from card 14) | | | | | | | | | |
| N9 | N8 | N7 | N6 | N5 | N4 | N3 | N2 | N1 | |
| 0 | 0 | 0 | 0 | 0 | 0 | 0 | 0 | 0 | END CODE |
| 1 | 1 | 1 | 1 | 1 | 1 | 1 | 1 | 0 or 1 | START TAPE LOOP (N1 = 0 regular limits N1 = 1 double limits) (Card numbers - arbitrary) |
| 0 | 0 | 0 | 0 | 0 | 0 | 0 | 1 | 0, 1, 2, or 3 | 10, 11, 12, or 13 |

-continued

| Decimal Code | | | | | | | | | Indication |
|---|---|---|---|---|---|---|---|---|---|
| (Prefix "D" indicates from cartridge 113, and prefix "R" indicates from card 14) | | | | | | | | | |
| N9 | N8 | N7 | N6 | N5 | N4 | N3 | N2 | N1 | |
| 0 | 0 | 0 | 0 | 0 | 0 | 0 | 2 | 0 | . |
| 0 | 0 | 0 | 0 | 0 | 0 | 0 | 3 | 0 | . |
| 0 | 0 | 0 | O | 0 | 0 | 0 | 4 | 0 | . |
| | | | | | | | | | . |
| | | | | | | | | | . |
| | | | | | | | | | . |

Note that in the exemplary format, the least-significant digit (N1, N2) indicates credit limits; however, the remaining digits are simply arbitrarily assigned. Thus, the owner of a card bearing the least-significant digit 0 would normally be entitled to total credit purchases up to an aggregate amount of $20.00 per month at any of a plurality of stores or stations unless "double" credit limits were active. Similarly, as set out, increased amounts would be permitted the owners of cards having designations 1, 2, and 3.

Considering the operation of the system initially very generally, as indicated the card 14 (FIG. 2) carries: an identification number; the month when last used; the aggregate value of transactions supported during that month; and the aggregate value of transactions supported at "off-line" units during the last month when used "off-line", all in signal-represented form. The cartridge 113 (FIG. 5) records credit limits to be imposed (regular or double) and unacceptable card identification numbers. The switches 110 (FIG. 5) indicate the instant month and the switches 118 (FIG. 4) indicate a representation of value for the contemplated transaction.

In the disclosed embodiment, a current period (month) which, of course, might well be a day or any practical time period (or different periods) is recorded in both the channels 40 and 43 (FIG. 2a). Although such partial redundance may be desired in some circumstances, as disclosed herein, the space occupied by the period signals (RO1-RO4) might well be employed for other data in alternative embodiments. For example, a record may be made identifying the specific remote units TU at which "off-line" transactions occur. As another example, a record of the last "on-line" use may serve to indicate the lack of such confirmation of cards after an extended period of use. Alternatively, the space may be employed to flag the transfer of "off-line" transactions to the central unit CS (FIG. 1) as in relation to a funds transfer. In that sense, implementations hereof may function well in automatic funds-transfer applications, recognizing that "off-line" transactions necessitate special treatment.

Returning to the structure of the disclosed embodiment, upon insertion of the card 14 (FIG. 1a) the system senses the card to determine: the month (time) when the card was last used and the amounts of aggregate credit purchases consummated during that month and aggregate credit consummated at "off-line" units. If the card is presented at a unit TU which is currently "on-line", usually communication with the central account unit CS results in either an "approval" or a "disapproval" which is manifest by illumination of either the green lamp 18 or the red lamp 20, respectively. Upon such an occurrence, the transaction nevertheless is recorded on the card 14. Specifically, the record in channel 40 (aggregate value of transactions in current period) is updated. However, in the present disclosure, the record in channel 43 (aggregate value of "off-line" transactions) is left unchanged, after being sensed to provide the represented data to the central station CS, where it may enter into the determination of approving (or disapproving) the instant transaction. Alternatively, the system may clear the channel 43 if a fresh time period has been entered.

Should the unit TU, in a current situation be "off-line" for one reason or another, the "approval" or "disapproval" is based mostly on the record of the card and established limits. In that regard, as apparent to one of skill in the art, the system facilitates automatic card renewal or rejuvenation on the basis of proper use within the time and value confines.

Pursuing the events that occur at an "off-line" unit TU, somewhat generally, the card is sensed with respect to time and value. If the card registers no credit purchases during the current month, and the contemplated transaction is within the imposed limit, the card is effectively rejuvenated and tentative approval is manifest. However, if credit purchases have been made in the instant month, they are totalled with the amount of the proposed purchase, and tentative approval is indicated only if the limit is not exceeded. Tentative approvals are confirmed as final after scanning the unacceptable identification numbers carried by the cartridge 113.

Considering the operation of the system generally in somewhat greater detail, on each use, the drum 102 (FIG. 1a) is set to indicate the amount of the contemplated purchase. The month drum 100 (internal) is coded to provide D1-D4 while the amount drum 102 provides signals D5-D9.

It is to be noted, that the code format D5-D9 (or R5-R9) as set forth above in chart form, is applicable to amounts of individual purchases as well as the aggregate or total purchases as recorded by binary signals on the card 14.

After setting the amount of contemplated purchase, the operator inserts the credit card 14 into the unit 12 which senses the signals R1-R4 (indicative of the month when the card was last used) for comparison with the signals D1-D4 in a similar code locally or at the central unit CS (representative of the current month). If the card has not been used during the current month, it is rejuvenated. For example, in the "off-line" mode if the proposed purchase is within the limit, and if the card is acceptable, a green light 18 is illuminated to indicate approval. In the "on-line" mode, other considerations may be involved but a fresh time is recorded on the card channel 40 in either mode.

If the machine senses that the card has been used during the current month, it is reflected in the "on-line" decision. If "off-line", the unit TU adds the amount indicated on the drum 102 (representing the current transaction by signals D5–D9) to the accumulated amount of purchases previously made during the month as recorded on the card (represented by signals R5–R9). If the amount exceeds the permissive limit, the red light 20 is illuminated indicating that the purchase would exceed the limit. Of course, the red light 20 is also illuminated if the card number is carried in the cartridge 113 as unacceptable. Otherwise, the green light 18 is energized.

As still another possibility, if the machine detects a malfunction or a misrecording, a yellow light 22 is illuminated. It is readily apparent that the system may be conveniently employed in multiplicity at widely remote locations to effectively manifest a current status.

As disclosed herein, the structure is not extended to accommodate the "year" component of the date. However, such structure merely represents an extension of the system as disclosed and has been eliminated in the interest of simplification in the teaching. Generally, the inclusion of structure to record the "year" in dates serves to combat manipulation of the registers by a dishonest employee as to accommodate an accomplice. With the "year" incorporated in the system, if a future date was set on a machine by a dishonest clerk to authorize a purchase exceeding the current limit on the card, the card would be marked against further use on machines set with the current date until the future date recorded on the card is reached. As an example, an accomplice clerk might adjust the "year" in processing a long un-used card to approve a large cumulative value. Various ratchet structures and the like might therefore be incorporated to prevent manipulation of the registers as to accommodate dishonest use of a card.

Figure 6A:
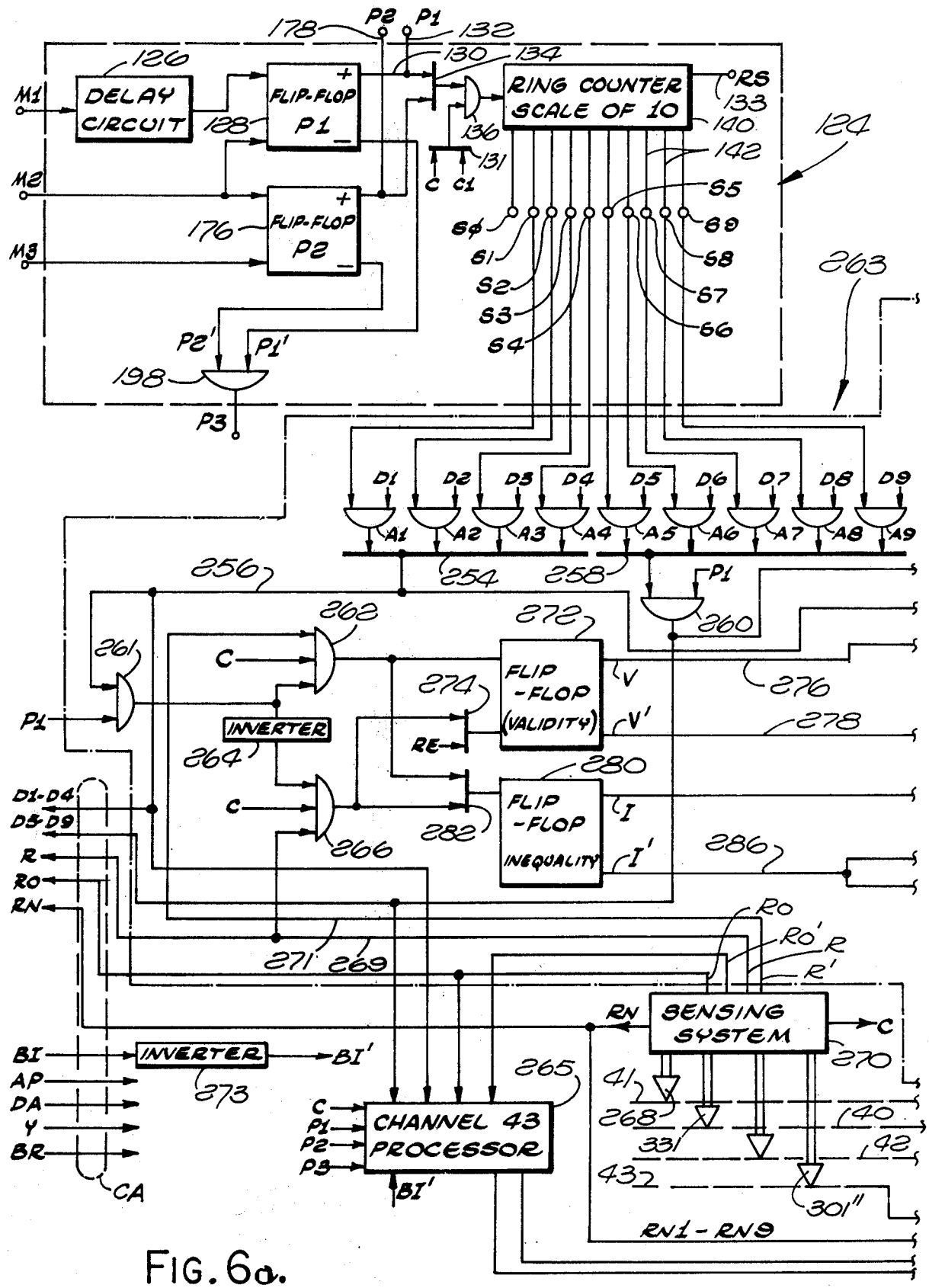
FIGS. 6a and 6b jointly are a diagrammatic representation of the electrical system of the structure of FIG. 1.

Considering the complete operation in somewhat greater detail, as indicated above, the drum switches 110 and 118 (FIGS. 4 and 5) provide nine binary digits, e.g. digits D1–D4 (the current month) and digits D5–D9 (the dollar amount). The signals D1–D9 (current time and value of transaction in question) manifest data that is pertinent to approval considerations whether the unit TU is "on-line" or "off-line". The unit TU is indicated to be either "on-line" or "off-line" by the high or low state respectively of the received signal BI. The binary devices BI1–BI5 (FIG. 1) associated with the terminal units TU1–TU5 provide a high level of the binary signal BI to indicate "on-line" and a low level (BI') to indicate "off-line". Of course, as indicated above, for exemplary purposes, the unit TU5 is considered perpetually "on-line" and the unit TU4 is considered perpetually "off-line". The units TU1, TU2, TU3, and TU5 are connected through cables CA1, CA2, CA3, and CA5, respectively, to the multiplexer for access to the central unit CS. Somewhat generically, the cable CA is represented in FIG. 6a with a plurality of individual lines therein. Although separately represented in FIG. 1, for ease of explanation, the signal BI is indicated to be carried in the cable CA (FIG. 6a). Of course, the cable CA is merely exemplary of various communication links.

The signals D1–D9 are translated to a serial form for utilization in the unit TU and for transmission to the central unit CS. Specifically, the digital signals D1–D9 (FIG. 6a below timing system 124) are applied to a series of "and" gates A1 through A9, respectively. The gates A1 through A9 also receive input signals S1 through S9 which are provided from a timing system or circuit 124. The timing system 124 receives the timing signals M1, M2, and M3 and clock signals C and C1 to provide the signals S and the distinct phase signals P1, P2, and P3 which indicate sequential time phases of operation of the unit TU. The negation signals are also developed in the timing system. As well known in the prior art, the negation of a signal may be formed by a conventional inverter which reverses the state of a received two-state signal as widely used in the binary logic systems. In accordance with the convention hereof, the negation of a signal is represented by the signal designation followed by a symbol "'" thereafter.

In addition to developing the phase signals, the timing system 124 also provides sequence signals S1 through S9 (all connections not shown) which are time-indicative of the digit positions metered by the clock channel 42 on the card. That is, the signals S1 through S9 specifiy access time to the digit positions of the card channel 40, from least-significant to most-significant.

The specific structure of the timing system 124 includes a delay circuit 126 which receives the signal M1 and after a brief interval sets a flip-flop 128 indicating the card is in a position to be sensed. The flip-flop circuits employed herein may comprise any of a variety of bi-stable devices having a "set state" in which the positive output to one conductor (e.g. conductor 130) is high and the negative output is low, or a "reset" state in which the reverse is true so that the binary signal in the conductor 130 is low. The set state of the flip-flop 128 manifests the first phase P1, during which the signal P1 is high and during which magnetic signals are sensed from the identification card.

During the first phase of operation, the high signal P1 appears at a terminal 132 and is applied through an "or" gate 134 and an "and" gate 136. The gates 134 and 136 may take any of a wide variety of forms as well known in the prior art to accomplish the logic operations thereof on applied binary signals.

During the first phase, the set-state of the flip-flop 128, providing the signal P1 high, qualifies the "and" gate 136 to pass clock pulses C to a scale-of-ten ring counter 140 (applied through "or" gate 131). The counter 140 may take a variety of different forms as well known and readily available in the prior art, and has ten output conductors 142 one of which exclusively provides a high signal to indicate the current state of the counter. In accordance with the operation of such counters, each pulse applied (as from the gate 136) advances the state of the counter so that the signal high-state binary signal progresses to the next conductor 142 in sequence. The counter is reset by application of a reset signal to a terminal 133, as described below.

The first conductor 142 from the counter 140 carries a signal S$\phi$ which manifests the reset or quiescent state of the counter 140. The conductors 142 in sequence then carry the signals S1 through S9 which are applied from the timing circuit 124 to the series of "and" gates A1 through A9. In this manner, these gates are qualified by the series of sequential signals S1 through S9 in synchronism with the sensing of the digit positions in clock channel 42 of the card 14. Specifically, for example, the gate A1 is qualified by signal S1 during the sensing of the first digit position (least significant) in the channel 42. The gates A2 through A9 are thereafter qualified in sequence by the signals S2 through S9 in timed relationship to the card-sensed signals R2–R9, RO2–RO9, and RN2–RN9.

As indicated above, the gates A1 through A9 also receive input signals D1 through D9, respectively, which are the signals sensed from the switches 110 and 118 (FIGS. 4 and 5). The "and" gates A1 through A9 are qualified by the timing signals S1 through S9 in sequence to provide internally registered (date) signals D1 through D4 through an "or" gate 254 to a conductor 256, and signals D5–D9 (value) through an "or" gate 258 to an "and" gate 260 which also receives the first phase signal P1.

Figure 6B:
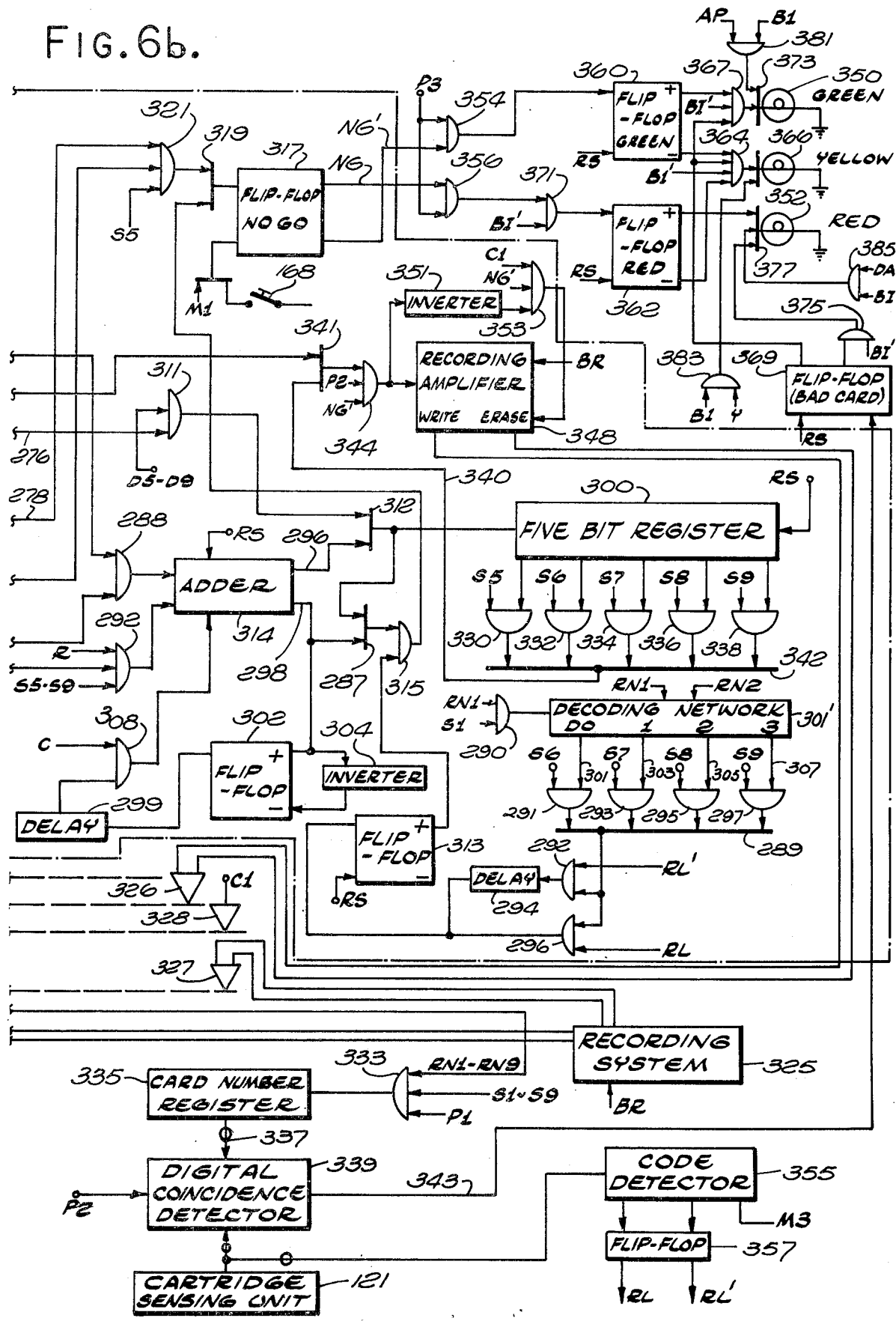

The serialized signals D1–D9 (conductor 256 and gate 260) representative of the current time (indicated by unit TU) and the value of the contemplated transaction are applied at three locations. First, these signals D1–D9 are provided through the cable CA (FIG. 6a, lower left) to the central unit CS (FIG. 1). Also, the signals D1–D9 are applied to a total transaction processing network 263 (broken line, central portions of FIGS. 6a and 6b) for controlling the channel 40. Finally, the signals D1–D9 are also applied to an "off-line" transaction processing network 265 which is similar to the network 263 and consequently in the interest of simplicity is represented by a single block. Essentially, the total transaction processing network 263 provides "off-line" approvals or disapprovals and maintains the track 40 (FIG. 2a). The transaction processing network 265 (FIG. 6a) similarly operates, if qualified, to maintain the track 43, e.g. to provide information of "off-line" activity for "on-line" evaluation. Of course, the card subject is also identified to the central unit CS (channel 41) as discussed in detail below.

If the unit TU is "on-line", the received signal BI is high in the cable CA. Consequently, approval or rejection will be provided from the central unit CS, manifest by one of the signals Y, AP, or DA. However, during the operation, the total transaction processing network 263 operates as disclosed in detail below to update the contents of the track 40. In view of the integral relationship of the structure for performing that operation with the structure for generating "off-line" approval signals, such signals (developed during "off-line" operation in the disclosed embodiment) are blocked prior to application for controlling the manifesting lamps. As a consequence, the detailed operation of the unit TU during the "off-line" mode will be explained at this point, after which the details of the "on-line" mode will be completed.

The signal BI' is provided in a high state from an inverter 273 (FIG. 6a, lower left) when the unit TU is "off-line". Thus, "off-line" operation is commanded by the high state of the signal BI'. However, in either event, certain time comparisons are performed as will now be explained.

The comparison of time signals (D to R) involves the conductor 256 (FIG. 6a, left) which carries the month signals D1 through D4 to an "and" gate 261 which is qualified during the first phase of operation by the signal P1. Thus, during the first phase, the signals D1 through D4 are applied to an "and" gate 262 and through an inverter 264 to an "and" gate 266. The "and" gate 262 also receives the signals R' (R1'–R4') through conductor 271 which are sensed from the channel 40 of the card and which indicate the month recorded thereon as described below in detail.

Specifically, the channel 40 is sensed by a head 331 to formulate the signals R and R' in the conductors 269 and 271 (in accordance with the adopted convention) by a sensing system 270 as well known in the art. The negation signals R' are applied to the gate 262 along with clock signals C and the true signals D1, D2, D3, and D4 which are thus compared with the negation signals R1', R2', R3', and R4'. As described, the presence of a "one" digit in the negation signals R' indicates a zero; therefore, if the signals D1–D4 represent a month which is later (higher value) than the month represented by the signals R1–R4, the gate 262 is qualified and passes a signal to set a flip-flop 272. The flip-flop 272 is reset if the reverse situation is detected by the gate 266. That is, as the gate 266 receives the negation of the signals D and the true signals R it becomes qualified by the occurrence of higher values for R indicating later months. As previously described, the most significant digits are treated last; therefore, the final state of the flip-flop 272 indicates which of the values is higher and, therefore, which of the values represents a later month.

The output from the gate 266 is applied to the flip-flop 272 through an "or" gate 274 which also receives the manually timed reset signal RE. As a result, the flip-flop 272 is reset at the initiation of operation and continues to be reset at the conclusion of the first phase unless the card registers a month (R1–R4) earlier in time than the internal register (D1–D4). In such a situation, wherein the flip-flop 272 is set, a validity signal V is established high in a conductor 276 while the negation signal V' appears in a conductor 278.

In the event of favorable dissimilarity between the signals R1, R2, R3, and R4 and the signals D1, D2, D3, and D4 (card month earlier) it is necessary to update the record on the card. The occurrence of each dissimilarity is registered in a flip-flop 280. The flip-flop 280 is set through an "or" gate 282 which receives the output from the gate 262 as well as the output from the gate 266. Therefore, the initially reset flip-flop 280 is set upon detection of any dissimilarity between the signals of concern, regardless of which signals indicate a higher value or a later month.

At the conclusion of the signal S4, the flip-flops 272 and 280 are independently either set or reset. Summarizing, the flip-flop 280 is reset if the reference month signals D (unit registered) and the subject month signals R (card recorded) are the same: The flip-flop 272 is set if these signals indicate the card has not been used during the current month. If the card was used last, prior to the current month (flip-flop 272 set) it is merely necessary to assure that the current purchase does not reach the applied limit for tentative approval. As described in detail below, this is done by setting a flip-flop 313 (center FIG. 6b) with a time selected one of the signals S5–S9, to indicate the limit of the amount of the intended transaction. Any excess is then presented by the signals D5–D9 through an "or" gate 287 to qualify an "and" gate 315.

The flip-flop 313 receives time-critical signals from "and" gates 291, 293, 295, and 297 through either a gate 292 and a one-bit delay circuit 294 or directly through an "and" gate 296. One of the "and" gates 294 or 296 is qualified, depending on the state of a flip-flop as described below for providing signals RL and RL'. If RL is high, regular limits are in force; however, if RL' is high, the regular limits are doubled. This structure may be variously used. For example, certain locations may desire increased limits or standards. However, in any event, the system affords greater flexibility stemming from the incorporation of structure for current information afforded by the magnetic tape cartridge 113, as illustratively described herein. The detailed structure for providing the signals RL and RL' from the cartridge 113 is described below.

The signals provided to the flip-flop 313 (under control of signals RL and RL') are time sequenced with reference to the values $20.00, $40.00, $80.00, and $160.00, which are identified by the timing signals S6, S7, S8, and S9. That is, as apparent from the above chart, these signals in time sequence are associated with the specified dollar values. The gates 291, 293, 295, and 297 are, therefore, connected to receive credit limit signals from a decoding network 301' which is controlled by the least significant digits of the card number to indicate the customer's credit limit. Specifically, the regular limits in the assumed example are as indicated above from $20.00 to $160.00, depending upon the digit signal RN1, RN2 of the card number, as indicated to be applied to the network 301'. Exemplary of the structure for performing the operation is that illustrated in detail for RN1. The digit is received through an "and" gate 290 during the interval of signal S1 for further decoding by a network 301', as well known in the art, to provide one of four outputs 301, 303, 305, or 307 high to thereby selectively qualify one of the "and" gates 291, 293, 295, or 297.

The application of a high binary signal from the "or" gate 289, to the flip-flop 313 sets that flip-flop when the card holder's limit has been reached. Thereafter, the occurrence of any further signals to indicate the dollar limit has been exceeded will qualify the "and" gate 315 to set a flip-flop 317 through an "or" gate 319. The set state of the flip-flop 317 provides the signal NG high to indicate the transaction is not acceptable, as will be described below in detail.

In addition to performing the comparison described above, the system must record the amount of the contemplated transaction for future reference. Therefore, the signals D5, D6, D7, D8, and D9 pass through gate 311 and through the gate 312 to a storage register 300. The removal of these signals (or total signals) from the register 300 for recording in the card channel 40 is described below.

If the card has been used during the current month, the system must add the dollar volume of transactions for which the card has been used during the current month to the value of the proposed transaction, in order to ascertain whether or not the proposed transaction will exceed the allowed aggregate limit. This situation is manifest by a reset state for the flip-flop 280 (lower center FIG. 6a) forming the signal I' high. The negation signal I' (in conductor 286 indicating month coincidence) commands that the transactions be totalled and is applied to an "and" gate 288 (FIG. 6b) which also receives the signals D5, D6, D7, D8, and D9 in sequence, from the "and" gate 260 representing the amount of the proposed present purchase. The output of the gate 288 is applied to an adder 314. The other input to the adder 314, signal R (R5, R6, R7, R8, and R9) is applied through a gate 292 (clocked by signals S5–S9). The gates 288 and 292 thus comprise the inputs to the binary adder 314 as well known in the prior art for producing "sum" signals in a conductor 296 and a "carry" signal in a conductor 298 and which is cleared by the reset signal RS.

The signals D5–D9 and R5–R9 are additively combined in the adder 314 and the sum signals are registered in the five-stage register 300 for temporary storage pending the time when the signals will be recorded on the card during the second phase of operation. It is to be noted, that carry digits are propagated in the operation of the adder 314 as generally well known in the prior art by means of a flip-flop 302. An inverter 304, and a delay circuit 299 which is returned to the input through a clock-qualified "and" gate 308 are well known in the prior art.

During the period of phase one (P1) when the sum digits are being placed in the register 300, these signals are also being tested against the authorized limit. Specifically, the "sum" output from the adder 314 is passed through conductor 296 and gate 312 to be tested against the limit signals by the "and" gate 315 as previously described. If the limit is reached, the "no-go" flip-flop 317 is set.

The flip-flop 317 will also be set when the recorded card date is later than the current date, as would result from tampering. This situation is manifest by the flip-flop 272 being reset, and the flip-flop 280 being set. Thereupon, an "and" gate 321 is qualified and at the time of signal S5 the gate 321 passes a signal to set the "no-go" flip-flop 317.

Summarizing with regard to the aggregate value of transactions and related time (channel 40), at the conclusion of the first phase of operation, the flip-flop 317 is either reset to indicate a tentatively approved transaction or set to register disapproval, i.e. "no-go". Additionally, the total purchases for the present month (including the contemplated purchase) are registered as an aggregate sum in the register 300 to be recorded in channel 40 of the card during the second phase of operation.

Also during the first phase of operation, the total "off-line" purchase for the present month (including the contemplated purchase, if "off-line") is registered in a register within the "off-line" processor 265 to be recorded in channel 43 of the card during the second phase of operation. Generally, in the disclosed embodiment, if the unit TU is "on-line" the record in the channel 43 is preserved to indicate the last time and aggregate of transactions "off-line" in the channel 43. However, it is here noteworthy that a signal BR may be provided to clear the channel 43 during the second phase of operation, on command from unit CS.

If the unit is "off-line", the "off-line" processor 265 functions as described above with reference to the detailed "on-line" processor to manipulate the data representative signals from channel 43. Summarily, at the conclusion of the first phase, a pair of flip-flops in the processor 265 (identical to flip-flops 272 and 280) manifest the results of a comparison of between the instant time and that sensed from the channel 43. Also, a register in the processor 265 (identical to the register 300) holds the aggregate total of "off-line" transactions.

Considering the operations with reference to channel 43 in somewhat greater detail, that channel is sensed by a head 301" which is coupled to the sensing system 270. The signals RO (RO1–RO9) are provided from the sensing system 270 and are coupled to the cable CA, along with the signals R (channel 40, R1–R9) and RN (channel 41, RN1–RN9).

As indicated above, other signals received by the cable CA are signals D1–D9 indicative of the time and value manifest at the unit TU. Accordingly, in the "on-line" state, the central unit CS (FIG. 1) is provided with specific data for formulating a response including: identification of the subject (RN); value extended to the subject during the current time (R); value extended to the subject at "off-line" units, during the last time of an "off-line" use (RO) and the amount of the contemplated transaction along with a time confirmation (D).

Returning to a consideration of the data signals from channel 43, the signals RO (RO1–RO9) and RO' (RO1'–RO9') are applied to the processor 265 along with signals C, P1, P2, P3, and BI' which are indicated. Additionally, the processor receives the timing and reset signals internally applied as described with reference to the processor 263. Operation of the processor 265 is conditioned upon receipt of a signal BI' indicating that the unit TU is "off-line". That is, an "on-line" signal BI is received through the cable CA to indicate that state, and is applied to an inverter 303 to develop the negation signal BI'. Accordingly, the high state of BI' manifests an "off-line" configuration or state to command operation of the processor 265. Otherwise (signal BI high), the contents of the track 43 are either recorded unaltered, or blocked to clear the track 43 responsive to a command signal BR from the central unit CS. The latter operations are related in detail to the disclosed embodiment below. However, during "off-line" operation, the processor 265 operates just as the related component structure of the processor 263 (described above) to set flip-flops (not shown separately) to indicate the time situation and to register a transaction total in a register (not shown separately).

In the second phase of the operation, initiated by the signal M2 and defined by the signal P2, the channels 40 and 43 on the card are available to recording heads 326 and 327 for synchronized recording under control of pulses C1 from the parallel clock channel 42 sensed by a head 328. Also during that interval, the unacceptable card numbers from the cartridge unit 121 are compared with the number of the instant card.

Initially, consider the recording operation in channel 40. If clearance is given, an "or" gate 341 (FIG. 6b, upper central) first passes the signals D1–D4 (second serializing, representing the present month) which in turn pass through a gate 344 to a recording system 348 from which they are recorded in the channel 40. It is to be noted that "one digits" are recorded by direct application to the amplifier 348, while "zeros" are recorded by passage through an inverter 351 to an "and" gate 353 (qualified by NG' and Cl) to drive the amplifier 348 to erase the instant content of the channel.

After the month signals D1 through D4 are recorded, the digits of the register 300 are serially stepped out under control of the signals S5–S9, to pass through the "and" gates 330, 332, 334, 336, and 338 in sequence, then through the "or" gate 342, the conductor 340, the gate 341 and the gate 344 to drive the recording amplifier to energize the recording head 326. In this manner, the aggregate or total value of purchases during the current month is recorded.

Considering the operation in greater detail, the contents of the register 300 (accumulated value) in five stages is applied to the five "and" gates 330, 332, 334, 336, and 338 which are qualified during the second phase P2 of operation by the signals S5 through S9, respectively. As a result, the binary contents of the register 300 is serialized during the period of the timing pulses S5 through S9 to appear as a series of binary pulses in a conductor 340 which applies the output of each of the gates through an "or" gate 341. The conductor 340 supplies the series binary signals through an "or" gate 341 to an "and" gate 344 which is qualified by the signal P2 indicating the second phase of operation during which recording takes place.

Concurrently with the recording in channel 40 by the head 326, recording may also occur in the channel 43 by the recording head 327. Recapitulating, if the unit TU is "on-line", the contents of the channel 43 is left unaltered, unless it is cleared or revised by a command signal BR provided from the central unit CS at the beginning of phase two (P2). The implementation of that operation will now be considered. Unless the "off-line" processor 265 receives a high level of the signal BI' (indicating an "off-line" state), the processor 265 remains inoperative. Consequently, in the "on-line" the processor is quiescent and provides no control signals through lines 329 with the result that the recording system 325 remains inactive and signals recorded in the channel 43 are unaltered.

After receiving the data transferred during the first phase (P1) the central control unit CS may provide signals BR to accomplish various changes. Specifically, the signals BR are applied to the recording amplifier 348 and the recording system 325 to accomplish desired changes in the channels 40 and 43. For example, the signals BR may clear the channel 43 as containing stale or useless data. Alternatively, the signals BR might record a fresh value (D5–D7) in the channel 41 to reflect changes in a person's account as known at the central station CS. Of course, various other possibilities exist.

If the unit TU is "off-line", the processor 265 operates (signal BI' being high) to record the current time (RO1–RO4) and the updated transaction value (RO5–RO9) in the channel 43. Specifically in that regard, the structural details and operation within the "off-line" transaction processor 265 coincide to the same details as explained with reference to the detailed logic of the total transaction processor 263. In such a manner, the fresh values represented by the signals RO1–RO9 are applied during the second phase (P2) from the processor to the recording system 325 to accomplish the fresh record of aggregate "off-line" transactions during the current time.

As the recording on the card 14 is completed the card clears the recording heads 326 and 327, the second phase (P2) terminates when the card number comparison is complete. The operation of the system, during the second phase (P2), to determine whether or not the card number under investigation has been revoked, will now be considered. The numbers of revoked cards are registered on magnetic tape contained in the cartridge 113 (FIG. 5) from which indicative sets of signals DN1–DN9 are provided. The number of the card under investigation is sensed, as indicated above, from a channel 41, (FIGS. 6a and 6b) by a head 268 to provide a single set of signals RN1–RN9 representative of the code number. The signals RN1–RN9 are gated through an "and" gate 333 during the first operating phase (P1) into a register 335.

A cable 337 connects the register 335 to a digital coincidence detector 339 which is similarly connected to the cartridge sensing unit 121 (FIG. 5). The cartridge drive unit 117 is actuated during the interval of the signal P2 with the result that the sets of signals DN1–DN9 (representing revoked numbers) are supplied through a cable to the digital coincidence detector 339 (activated by signal P2) seeking coincidence with the signals RN1–RN9 held by the register 335. Various forms of coincidence detectors are well known in the art.

If the coincidence detector 339 senses an identity, a pulse is produced in a conductor 343 which sets a flip-flop 369. The set state of the flip-flop 369 actuates a red bulb 352 (associated with the lamp 20, FIG. 1a) and inhibits "and" gates 367 and 364 so that no other bulb can be energized. Note that the flip-flop 369 is reset by the reset signal RS.

If the detector 339 does not sense a coincidence and reaches the end code word (DN1–DN9) 000000000, the card number is indicated to be clear. Specifically, at the end of the tape, the end code word is detected by a code detector 355 (bottom FIG. 6b) to provide the signal M3 high, thereby initiating the final phase of operation manifest by the signal P3.

The code detector 355 also detects the presence of either the code 111111110 or 111111111 as start codes to indicate the use of regular value limits or alternatively, double value limits. The former code sets a flip-flop 357 to provide the signal RL high, while the latter code group sets the flip-flop 357 to provide the signal RL' high. The use of these codes to control the imposed credit limits was considered in detail above.

During the third phase of operation (signal P3), the various signals are applied to indicate whether or not the proposed transaction is authorized. First, consider the "off-line" mode of operation. If the signal NG' from the flip-flop 317 (FIG. 6b, upper left) is high, indicating that the card is clear, the green light 350 is to be illuminated; and if the signal NG is high, the red light 352 may be energized. The signals NG' and NG are applied to "and" gates 354 and 356, respectively, which gates are qualified as the third phase starts. Therefore, either: the gate 354 is qualified to set a flip-flop 360 or the gate 356 is qualified to set a flip-flop 362 (providing the "and" gate 371 is qualified by signal BI', "off-line"). The flip-flops 360 and 362 provide the signals GR and RD, respectively, to selectively illuminate one of the lights 350 or 352. If, however, neither of the flip-flops 360 nor 362 is set, and operation is "off-line", the signals GR', BI', RD' therefrom qualify "and" gate 364 to illuminate the yellow light during the third phase of operation.

With the flip-flop 360 set, and no indication of a bad card, the "and" gate 367 is qualified during "off-line" operation (BI') and the light 350 is energized through a connection "or" gate 373 to indicate approval. Rejection or disapproval is manifest in the "off-line" mode by the flip-flop 369 and the signal BI' qualifying an "and" gate 375 to energize the lamp 352 through an "or" gate 377.

In the "on-line" mode, the approval signal AP (received through the cable CA, FIG. 6a) is applied at a high level to an "and" gate 381 which is qualified by the "on-line" signal BI, and accordingly energizes the green light 350 through the gate 373. Somewhat similarly, the yellow light 366 is energized upon the qualification of an "and" gate 383 (BI and Y). In the same fashion, the red light 352 is energized by the qualification of an "and" gate 385 when the signals BI and DA (disapprove) are high. Thus, the system is effective to provide a direct indication of status as a basis for action.

It is readily apparent that the present invention may be variously embodied for purposes of control in the use of identification cards as broadly defined, as well as to effectively control action by card bearers. As suggested above, the various applications for different embodiments of this system are large in number and it is readily apparent that the criterion for the signals registered in the system may vary widely over different periods of time and for different measures of time. Accordingly, the scope hereof is understood to be defined by the claims as set forth below.

What is claimed is:

1. A system for use with credit cards, or the like, which includes a changeable recording medium, to control uses in relation to transactions, comprising:
   a plurality of terminal sensing means for sensing said recording medium on said card to provide card identification signals, first card use signals, and second card use signals;
   a central station means coupled for communication with at least some of said terminal sensing means during on-line operation, said central station means for receiving signals from specific of said terminal means during said on-line operation to provide approval-related signals responsive to signals from said specific terminal means;
   and
   a plurality of card processor means coinciding in number to said terminal sensing means and coupled thereto for providing approval-related signals other than during on-line operation, and for recording fresh first card use signals on said card to reflect each card-supported transaction and for recording fresh second card use signals on said card to reflect transactions not communicated to said central station means prior to approval.

2. A system according to claim 1 wherein: said use signals are representative of monetary values related to time intervals.

3. A system according to claim 1 wherein: said card processor means further includes means for providing transaction signals indicative of specific monetary values for transactions.

4. A system according to claim 1 further including data storage means for registering a plurality of card identification signals and further including means for testing said identification signals from said recording means against said identification signals from said data storage means to inhibit said means for providing approval.

5. A system according to claim 1 wherein said central station means includes means for providing control signals to indicate an on-line state to certain of said card processor means.

6. A system according to claim 1 wherein said card processor means includes means to record fresh card use signals related to use of said card with respect to a time period.

7. A system according to claim 1 wherein said terminal sensing means comprise magnetic sensing means for sensing signals from a magnetic medium.

8. A system according to claim 1 wherein said card processor means includes means to clear data from said card in response to a clear signal from said central station means.

9. In a system for controlling the aggregate use of a credit card or the like which bears a recording medium, whereby the card is to have a use limit during any of a series of time periods and wherein said system includes sensing means for sensing signals from said recording medium, and means for recording signals on said recording medium, the improvement which comprises:

time means for indicating one of said time periods for a card;

means coupled to said sensing means for providing use-related signals and time-related signals indicative of a prior aggregate use of said card during a particular period of prior use of said card;

means coupled to said time means, for processing said use-related signals and said time-related signals to provide approval signals upon a detection that the use of said card during said one of said time periods for said card is within said limited use; and means coupled to said means for recording, controlled by said means for processing, for providing signals to indicate a selected combination of said use limit with representations of the use of said card during said one of said time periods for said card.

10. A system according to claim 9 further including: a central station means coupled for periodic communication with said means for processing, said central station means for independently controlling said means to provide approval signals; and second means coupled to said time means for separately processing certain of said use-related signals and certain of said time-related signals which involve uses of said card that are approved by said means for processing independently of said central station means.

11. A system according to claim 10 further including: means for sensing said card to provide card identification signals; and means for communicating said card identification signals to said central station means.

12. A system for use with credit cards, or the like, which includes a changeable recording medium, said system to control uses of said cards upon presentation, in relation to aggregate transaction amounts during use times, comprising:

means for providing first electrical signals representative of a presentation time of a card;

means for providing second electrical signals representative of a use time recorded at said recording medium of one of said cards;

means for providing third electrical signals representative of an amount limit for the use of said card during a use time;

means for providing fourth electrical signals representative of an aggregate transaction amount recorded at said recording medium of said one card;

means for providing fifth electrical signals representative of a present transaction amount;

means for comparing said first and second signals to provide first and second control signals;

means under control of said first control signal for comparing said third electrical signals with said fifth electrical signals to provide a first approval signal in the event of a favorable dissimilarity between amounts represented by said third electrical signals and said fifth electrical signals;

means under control of said first approval signal for manifesting approval of said present transaction amount, and recording said fifth electrical signals as said aggregate transaction amount at said recording medium of said one card, and recording a fresh use time at said recording medium based on said presentation time of a card;

means under control of said second control signal for comparing said third electrical signals with a combination of said fourth and fifth electrical signals to provide second approval signals in the event of a favorable dissimilarity between amounts represented by said third electrical signals and said combination of signals; and means under control of said second approval signals for manifesting approval of said present transaction amount, and recording combination of said fourth and fifth electrical signals as said aggregate transaction amount at said recording medium of said card.

* * * * *

UNITED STATES PATENT OFFICE
CERTIFICATE OF CORRECTION

Patent No. 3,982,103    Dated September 21, 1976

Inventor(s) Robert N. Goldman

It is certified that error appears in the above-identified patent and that said Letters Patent are hereby corrected as shown below:

The term of this patent subsequent to October 5, 1988 has been disclaimed

Signed and Sealed this

Eighteenth Day of April 1978

[SEAL]

Attest:

RUTH C. MASON
Attesting Officer

LUTRELLE F. PARKER
Acting Commissioner of Patents and Trademarks